United States Patent [19]

Earle, Jr. et al.

[11] 3,767,430

[45] Oct. 23, 1973

[54] PROCESS FOR FIXING VOLATILE ENHANCERS IN SUCROSE

[75] Inventors: Ernest L. Earle, Jr., New City; Esra Pitchon, Flushing; Marvin Schulman, Monroe; Ravi Prasad, Middletown, all of N.Y.

[73] Assignee: General Foods Corporation, White Plains, N.Y.

[22] Filed: Feb. 24, 1972

[21] Appl. No.: 216,812

[52] U.S. Cl.............. 426/380, 127/29, 127/61, 426/456
[51] Int. Cl............................................. A23l 1/26
[58] Field of Search............. 99/140 R, 141 R, 99/78, 130, 139, 142, 199; 260/209 R, 233.3 R; 127/29, 58, 61

[56] References Cited
UNITED STATES PATENTS

| | | | |
|---|---|---|---|
| 3,314,803 | 4/1967 | Dame et al. | 99/140 R |
| 3,625,709 | 12/1971 | Mitchell | 99/140 R |
| 3,554,768 | 1/1971 | Feldman | 99/140 R |
| 2,854,343 | 9/1958 | Strashun et al. | 99/140 R |

Primary Examiner—Morris O. Wolk
Assistant Examiner—Stephen B. Davis
Attorney—Thomas R. Savoie et al.

[57] ABSTRACT

Volatile enhancer, such as acetaldehyde, is mixed with a high concentration aqueous sucrose solution. The mixture is cooled to effect crystallization of the sucrose in the presence of the enhancer. The crystalline slurry is partially dried to a pasty consistency of about 12 percent moisture content and blended with crystalline sucrose to further reduce its moisture content. The blended material is then dried to a stable moisture level.

20 Claims, No Drawings

PROCESS FOR FIXING VOLATILE ENHANCERS IN SUCROSE

BACKGROUND OF THE INVENTION

This invention is related to commonly assigned U.S. application, Ser. No. 36,666, filed May 12, 1970. This invention relates to a method for fixing volatile enhancers such as flavors, flavor enhancers, aromas, and aroma enhancers, and more particularly to volatile enhancers such as acetaldehyde, in crystalline sucrose to form solid compositions which are stable under normal shelf storage conditions, but which release flavoring and/or aroma when combined with either hot or cold water.

It has been known for some time that compounds such as acetaldehyde are important flavor components of natural fruits and vegetables and serve as flavor enhancers for the various flavor notes naturally present in meats, fruits and vegetables. Particularly, it has been found that acetaldehyde is very important in increasing the impact and freshness of certain flavors, such as fruit-type flavors. However, while the presence of acetaldehyde would be a valuable enhancer to a flavoring composition for use with a food formulation employing fruity-type flavors, it is difficult to incorporate acetaldehyde into a stable, solid flavor composition. Most attempts to fix acetaldehyde in various fixatives have tended to yield unstable compositions in the presence of small amounts of water or water vapor. This instability problem was apparent when powdered dessert and beverage products containing the fixed acetaldehyde was processed or packaged in a manner allowing atmospheric or product moisture to reach the fixed acetaldehyde during storage of the product. This problem is particularly acute when a fruit-type dessert or beverage formulation using a fixed acetaldehyde flavor is packaged in dry form in a non-hermetically sealed paper envelope or container which is sufficiently pervious to allow atmospheric moisture to enter and react with or dissolve the acetaldehyde.

Acetaldehyde is chemically very reactive; it is very soluble in water; and it has a low boiling point (21°C). It exists as a gas at normal room temperature and pressure. It, furthermore, is readily oxidized to form acetic acid, and it easily polymerizes to form paraldehyde an metaldehyde. Thus, the problem confronting the food industry in augmenting the flavor and aroma of dry powdered mixes has been that of "fixing" acetaldehyde in a sufficiently stable state to avoid volatization and/or chemical reaction during storage. It also is necessary to limit the degree of fixation to permit the release of the acetaldehyde compound during the normal household preparation of rehydrating or otherwise preparing a finished table product from the powdered mix (e.g., by addition of either hot or cold water.)

The above identified application, which is hereby incorporated by reference, sets forth a process in which sucrose is crystallized in the presence of volatile enhancers such as acetaldehyde in order to entrap low levels of acetaldehyde within the crystal structure of the sucrose. It has, however, not been previously practical to employ this fixation technique on a large scale, since it has been found that after the initial crystallization the resulting mother liquor has increased in acidity. This increased acidity hydrolyzes some of the dissolved sucrose present in the mother liquor to invert sugar and significantly reduces the crystal yields in subsequent crystallization operations. It is, therefore, not practical to recycle th mother liquor in commercial operations and obviously uneconomical to discard the mother liquor.

SUMMARY OF THE INVENTION

A commercial process for the production of sucrose fixed volatile enhancers such as acetaldehyde has been developed wherein low levels (e.g. about 0.2 percent by weight) of the enhancer material is entrapped and fixed within sucrose crystals. According to this invention a highly concentrated sucrose solution containing about 70 percent to 85 percent by weight is mixed with about 2.5 percent by weight of solution of volatile enhancer. This mixture is allowed to crystallize to obtain a crystal yield of about 50 percent. This crystalline slurry may then be vacuum dried to a moisture content of about 10 percent to 15 percent. The crystalline slurry is combined with crystalline sucrose in order to promote complete crystallization and to lower the moisture content to a point where the material can be dried in a conventional warm air dryer. The crystalline sucrose added to the slurry may also have volatile enhancers fixed within some of the crystals.

By means of this invention the entire fixation process, except for the final drying step, may be performed in a single modified crystallizer and a complete batch operation may be completed within a 24 hour period.

DESCRIPTION OF THE INVENTION

This invention pertains to a process for fixing volatile enhancers, such as acetaldehyde, in sucrose. The mechanisms for effecting the fixation in accordance with this invention is believed to be akin to what are known as crystal inclusions which are thought to result from the volatile compound being entrapped as an impurity within the crystal lattice during crystallization.

Since the amount of volatile enhancer that can be fixed by the method of this invention is relatively low (about 0.1 percent to 0.5 percent by weight and usually about 0.2 percent), it is contemplated that the commercial use of this invention would be in food products in which sucrose is an integral part of the composition. In this manner an enhanced food product may be produced with very little increase in the cost of raw materials.

Sucrose is a major component of many fruit flavored powdered food products such as gelatin desserts and beverage mixes, and is, therefore, a very functional fixing medium. It is contemplated that some or all of the sucrose present in these powdered food products may be replaced with the sucrose fixed enhancer material of this invention. The sucrose thus serves both as a normal component of the product and as a fixing medium for the enhancer.

As mentioned in application Ser. No. 36,666, crystalline fixation is especially suited for fixing those enhancers which are gaseous or which vaporize at normal room conditions. The volatile enhancers fixed within the crystals cannot be washed out and tend to remain permanently fixed until the crystal structure is destroyed.

The crystallization method used to produce the products of this invention comprises the formation of a high concentration sugar solution containing about 70 percent to 85 percent, preferably about 80 percent, by weight sucrose. These high concentrations are needed in order to produce crystal yields sufficiently high to make the process of this invention practical. At concentrations of about 85 percent or higher, however, the solution crystallizes too rapidly and thus hinders the fixation process. The high concentration sucrose solutions can be prepared by heating and dissolving crystalline sucrose in water or by concentrating commercial liquid sugars, either by removal of water or addition of sucrose.

The concentrated sucrose solutions are maintained at elevated temperature of about 200°F, in order to prevent premature crystallization, until the volatile enhancer is added. The volatile enhancer is added to the heated sucrose solution and the solution is slowly cooled and allowed to crystallize in the presence of the enhancer. Cooling is continued down to about 60°F where desirably a crystal yield of about 50 percent is achieved. The cooling may be accomplished in whole or in part by circulating a cooling medium through a jacketed crystallizer vessel. Preferably the crystallizing solution is continuously agitated, since it has been found that this tends to result in a higher crystal yield.

Normally crystallization proceeds at atmospheric pressure; however, either vacuum or pressure may be applied to the crystallizer. It has been found that superatmospheric pressure tends to lower crystal yield, probably due to the inhibition of crystallization caused by the presence of higher levels of volatiles during crystallization. Subatmospheric pressure tends to produce a higher crystal yield but lowers the fix level.

It is essential that the volatile enhancer be present in the sucrose solution during crystallization. This can be effected by the continuous addition of the enhancer, such as by bubbling the enhancer in a gaseous state, through the solution, during the crystallization step. Naturally the enhancer may be collected as it escapes from the sucrose solution and preferably recycled into the system.

A preferred method for insuring presence of the volatile enhancer during the cooling and crystallization operation is to use an overhead reflux condenser. According to this embodiment, the volatile enhancer is added to the sucrose solution which is initially at a relatively high (about 200°F) temperature. As the volatile enhancer vaporizes and escapes from the solution it is condensed by the overhead condenser and returned to the solution as a liquid. In this manner the volatile enhancer acts as a means to remove heat from the solution during the cooling and crystallization operation. A secondary condenser may also be used to recover any of the volatile enhancer not condensed in the overhead reflux condenser. Normally in this embodiment the reflux stops as the temperature of the crystallizing solution approaches the boiling point of the volatile enhancer, and the solution is permitted to approach room temperature, or if desired, is further cooled to about 60°F by suitable, preferably external, cooling means. The solution is then maintained at this temperature for a sufficient period of time to effect additional crystallization.

Use of crystallization temperatures significantly below the boiling point of the volatile enhancer tends to reduce the crystal yield. This is thought to be due to increased volatile retention during crystallization and the fact that presence of the enhancer material inhibits crystallization.

Crystal yield increases with crystallization time; however, a balance must be struck between time and yield. Although the rate of sucrose crystallization is somewhat inhibited by the presence of the volatile enhancer; it has been found that when operating in accordance with the teachings of this invention, crystal yields of about 50 percent can be obtained with an overall crystallization time of between about 10 and 16 hours. Use of this time period still permits complete processing in accordance with this invention of one batch per day per crystallizer unit.

The concentration of the volatile enhancer during crystallization should be maintained at a level of about 1.5 percent to 5 percent, preferably about 2.5 percent by weight of the sucrose solution. It has been found that lowering the enhancer addition level increases the yield but lowers the fix level. Increasing the enhancer addition level has the opposite effect.

After crystallization of the sucrose solution has been allowed to proceed to the desired degree, the partially crystalline slurry is processed in order to produce a stable terminal moisture level on the order of about 0.5 percent by weight. It has been found that direct drying of the slurry to much below about 12 percent moisture by weight results in the production of a hard amorphous mass which prevents the attainment of the desired low terminal moisture levels. To overcome this problem the slurry is blended with a quantity of dry crystalline sucrose in order to reduce the moisture content below 12 percent to from 4 percent to 8 percent by weight and preferably to about 6 percent. This blend may then be dried by conventional means, such as a warm air dryer, to a stable moisture level. It will also be possible according to this invention, to add-back crystalline sucrose which already has volatile enhancers entrapped within its crystal structure as the material used to reduce the moisture level of the slurry to below 12 percent.

According to a preferred embodiment of this invention the crystalline slurry, which has a moisture level of from 15 percent to 30 percent by weight, may be vacuum dried to a pasty consistency in order to reduce the moisture level to between 10 percent to 15 percent by weight, preferably to about 12 percent. This partial drying step has the additional advantage of reducing the amount of dry material which must be added to the slurry in order to obtain a 4 percent to 8 percent moisture level.

The sucrose fixed enhancer product produced in accordance with this invention may have a fix level of about 0.05 percent, based on a 50 percent crystal yield, a fix of about 0.2 percent in the sucrose that crystallizes in the presence of the volatile enhancer, and the use of pure crystalline sucrose, in an amount equal to the sucrose present in the slurry, as the material that is added to the slurry. Alternatively the fix level of the end product can be raised to about 0.1 percent by adding-back to the slurry, instead of pure sucrose, sucrose which already contains volatile enhancer within some of its crystals. As previously indicated such products are ideally suited for enhancing the flavor of powdered food materials which normally contain significant amounts of sucrose. The sucrose fixed product of this invention is relatively stable over long periods of time, even under conditions of elevated temperature and humidity.

The process of this invention is especially suited for fixing the sucrose fixation of those volatile enhancers, such as acetaldehyde, which may oxidize or otherwise convert to their acid counterparts. As previously indicated the presence of acid converts some of the sucrose in solution to invert sugar which greatly inhibits further crystallization and which, therefore, makes impractical the normal crystallization procedure of centrifuging the crystalline slurry in order to remove crystals and recycling the mother liquor into sequential crystallizing operations.

The process of this invention is further illustrated but not limited by the following examples.

Example 1.

An 80 percent sugar solution is made by heating sucrose and water with agitation in a crystallizing vessel. Acetaldehyde in the amount of 3 percent by weight of the solution was added to the solution at 200°F. with vigorous agitation. The crystallizer is equipped with an overhead reflux condenser, and the acetaldehyde acts as a heat carrier from the solution to the condenser. The solution is permitted to cool under these conditions and crystallization was observed to start at about 130°F. After about 30 minutes this solution had cooled to 80°F. The refluxing ceased at about this point and the solution was further cooled to about room temperature where additional crystallization was allowed to proceed for a period of 10 hours. Excess acetaldehyde and moisture were then removed from the liquor by applying 100°F at 28 inches Hg vacuum under continuous slow speed agitation. In about 4 hours a manageable paste was obtained having approximately 12 percent moisture. An equal weight of sucrose (solids basis) was added to this paste to obtain a 6 percent moisture level product which had a powdery appearance. This product was then dried in a Jeffrey-type dryer to a moisture level of 0.5 percent. The dried product was found to have a fix level of 0.05 percent of acetaldehyde by weight.

Example 2

20 pounds of water and 80 pounds of sucrose were heated at 215°F for 1/2 hour in a crystallizing vessel while under agitation. To the resulting solution 2.5 lbs. of acetaldehyde were added and the solution was cooled to 75°F in 1 hour by means of the overhead condenser described in Example 1. The partially crystalline solution was further cooled to 60°F and held for about 12 hours in order to obtain a crystal yield of about 50 percent. Two hundred and 40 pounds of sucrose fixed acetaldehyde having an overall fix level of about 0.1 percent (about 0.2 percent in half of the crystals, 0 percent in other half) was added to the partially crystalline slurry and this slurry was then dried for 20 minutes at 120°F in a warm air dryer to a moisture level of 0.5 percent by weight. The dried product was found to have a fix level of 0.1 percent of acetaldehyde by weight.

Example 3.

The sucrose fixed acetaldehyde product of Example 1 was evaluated for stability by incorporating 8.4 grams (containing 4.2 milligrams acetaldehyde) of the sucrose fixed acetaldehyde into a conventional orange flavored gelatin dessert powder. This powder was packed in waxpaper - polyethylene laminate pouches which are heat sealed and placed into paper containers. These containers were stored at 90°F and 70 percent relative humidity for a period of 16 weeks. At the end of this period the product was elevated and found to have lost only about 19 percent by weight of the acetaldehyde. Gelatin dessert formulated from these samples were found to possess an enhanced and desirable orange flavor. Comparable storage tests for mannitol fixed acetaldehyde products prepared in accordance with U.S. Pat. No. 3,314,803 found a loss of about 54 percent by weight of the acetaldehyde.

Example 4.

A sucrose solution is formulated, mixed with acetaldehyde and crystallized for a period of 10 hours in accordance with the procedure set forth in Example 1. The crystals are removed from the resulting slurry in a centrifuge and were dried to a 0.5 percent moisture level in a Jeffrey-type dryer. The dried crystals had a fix level of about 0.2 percent and the process obtained a 50 percent crystal yield. The mother liquor obtained from the centrifuge was brought to an 80 percent sucrose level by dissolving additional sucrose in the heated liquor. This concentrated liquor was also subjected to the crystallization process set forth in Example 1 where it was found that a sharp drop in crystal yield, from 50 percent to about 30 percent was obtained. The drop in yield was accompanied by acid buildup and inversion of sugar. Attempts to concentrate and further crystallize the second mother liquor resulted in still additional drops in crystal yield. This process is not projected as being commercially practical and does not constitute part of this invention.

It will be apparent that there are variations and modifications of this invention, and that examples, preferred proportions and ingredients as well as preferred operating conditions may be varied without departing from the scope of the invention.

Having thus described the invention what is claimed is:

1. A method for fixing volatile enhancers in sucrose comprising the steps of:
   a. forming an aqueous, sucrose solution, containing about 70 percent to 85 percent sucrose by weight, at a temperature sufficiently high to prevent premature crystallization,
   b. adding a volatile enhancer to the sucrose solution,
   c. slowly cooling the solution to effect crystallization of sucrose in the presence of volatile enhancer,
   d. reducing the temperature of the solution to at least about room temperature and maintaining this temperature in order to effect additional crystallization,
   e. blending a quantity of crystalline sucrose with the crystalline slurry to reduce the percentage moisture level of the slurry, and
   f. drying the blend to a stable moisture level.

2. The method of claim 1 wherein the crystalline slurry is partially dried to a pasty consistency before being blended with the crystalline sucrose.

3. The method of claim 2 wherein the paste has a moisture level of from 10 percent to 15 percent by weight.

4. The method of claim 3 wherein the paste has a moisture level of about 12 percent by weight.

5. The method of claim 3 wherein sufficient crystalline sucrose is blended with the paste to reduce the percentage moisture level of the blend to from 4 percent to 8 percent by weight.

6. Th method according to claim 4 wherein the sucrose solution is agitated during crystallization.

7. The method according to claim 6 wherein the volatile enhancer escaping from the solution is condensed and is returned to cool the hot sucrose solution.

8. The method according to claim 7 wherein a crystal yield of about 50 percent is obtained.

9. The method according to claim 7 wherein the volatile enhancer is acetaldehyde.

10. The method according to claim 2 wherein at least a part of the crystalline sucrose blended with the paste has volatile enhancers fixed with its crystals.

11. The method according to claim 1 wherein at least part of the sucrose blended with the crystalline slurry has volatile enhancers fixed within its crystals.

12. The method according to claim 11 wherein sufficient crystalline sucrose is blended with the crystalline slurry to reduce the percentage moisture level of the slurry to from 4 percent to 8 percent by weight.

13. The method according to claim 11 wherein the sucrose solution is agitated during crystallization.

14. The method according to claim 13 wherein the volatile enhancer escaping from the solution is condensed and is returned to the hot sucrose solution.

15. A method for entrapping low levels of acetaldehyde within sucrose crystals comprising the steps of:
   a. forming concentrated sucrose solution containing about 70 percent to 85 percent sucrose by weight,
   b. adding acetaldehyde to the sucrose solution at a level of about 1.5 percent to 5 percent by weight,
   c. slowing cooling the solution by condensing escaping acetaldehyde and retaining the condensate to the solution,
   d. further cooling the solution to a temperature of about 60°F.,
   e. maintaining said temperature for a sufficient period to achieve about a 50 percent crystal yield,
   f. vacuum drying the crystalline slurry to a moisture level of about 10 percent to 15 percent by weight,
   g. blending crystalline sucrose with said partially dry slurry to reduce the moisture content of the blend to from 4 percent to 8 percent by weight, and
   h. drying the blend to a stable moisture level.

16. The method according to claim 15 wherein the sucrose is dissolved in water at a temperature of about 200°F.

17. The method according to claim 15 wherein the sucrose solution is agitated during crystallization.

18. The method according to claim 15 wherein the crystalline slurry is vacuum dried to about 12 percent moisture.

19. The method according to claim 18 wherein sufficient crystalline sucrose is added to reduce the moisture content of the blend to about 6 percent.

20. The method according to claim 15 wherein at least part of the crystalline sucrose contains acetaldehyde within its crystals.

* * * * *

UNITED STATES PATENT OFFICE
CERTIFICATE OF CORRECTION

Patent No. 3,767,430   Dated October 23, 1973

Inventor(s) Ernest L. Earle, Jr. et al

It is certified that error appears in the above-identified patent and that said Letters Patent are hereby corrected as shown below:

In Column 1, Line 45, after "paraldehyde" and before "Metaldehyde" the word ...an... should read ...and...

In Column 2, Line 13, after "percent" and before "by" insert ...sucrose...

In Column 8, Line 4, after "and" and before "the" the word ...retaining... should read ...returning...

Signed and sealed this 8th day of October 1974.

(SEAL)
Attest:

McCOY M. GIBSON JR.
Attesting Officer

C. MARSHALL DANN
Commissioner of Patents